Oct. 31, 1933.        F. J. WEST ET AL        1,933,464
MEANS FOR LUBRICATING CONVEYERS
Filed Sept. 8, 1932        4 Sheets-Sheet 2
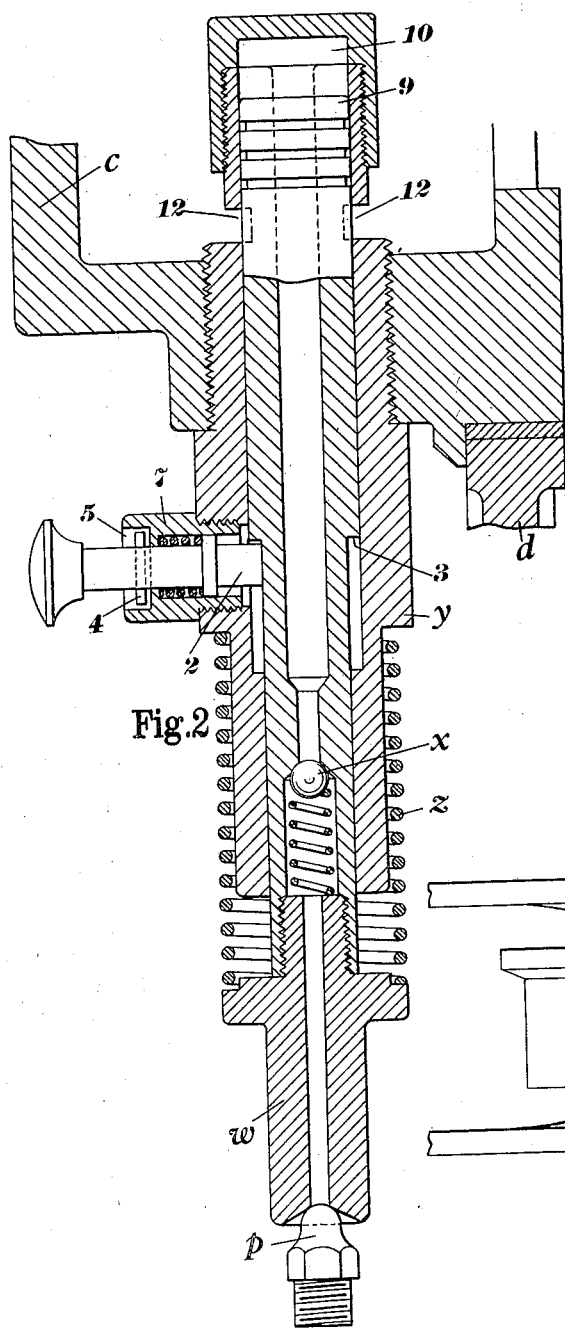
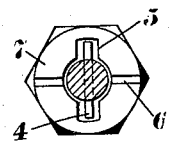
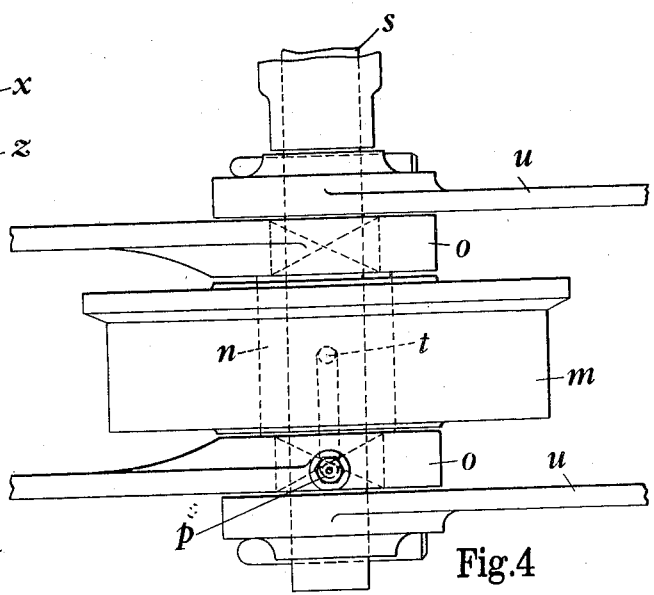
INVENTORS:
F. J. West
E. West
By: Marks & Clerk
ATTYS.

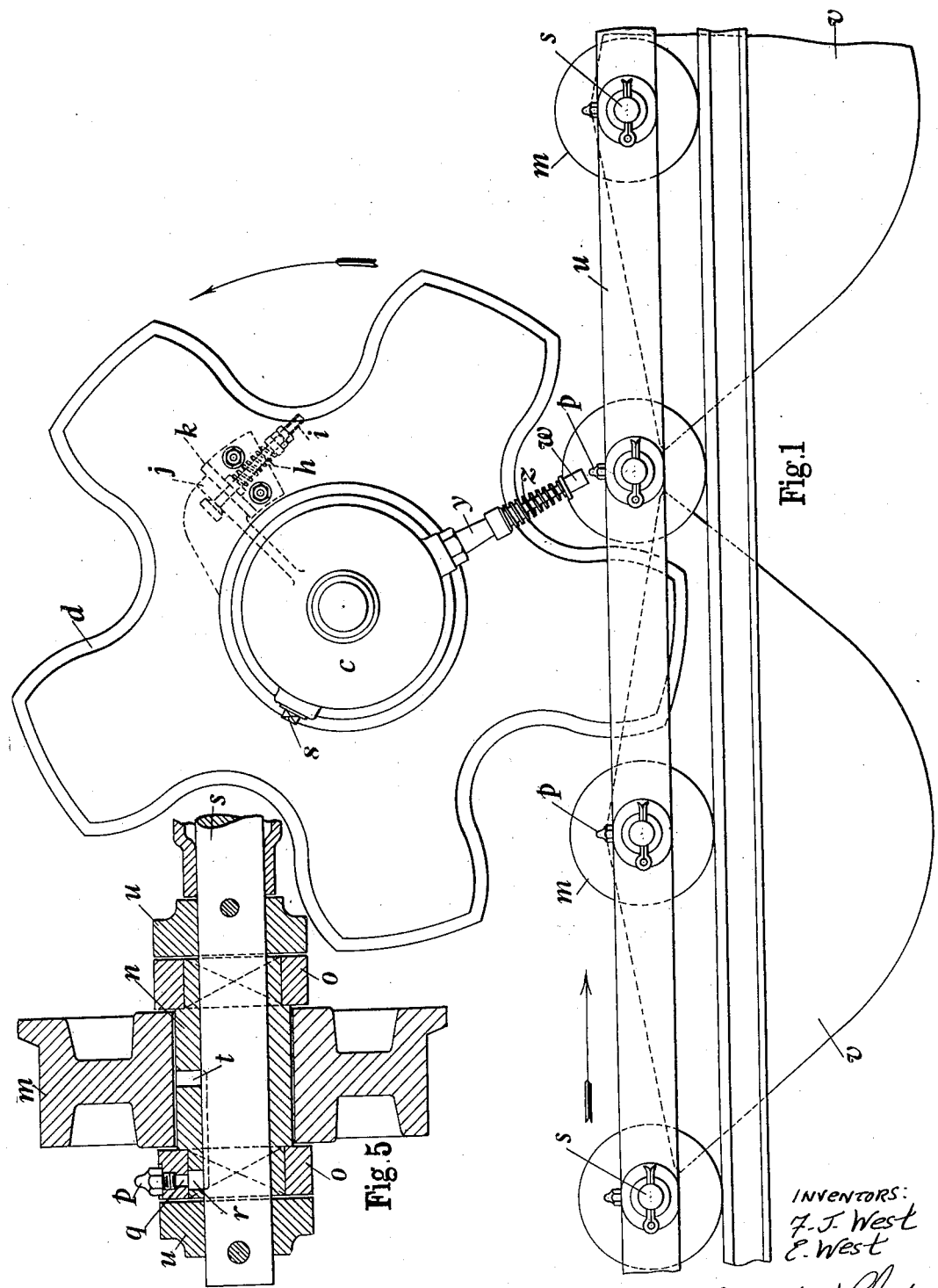

Patented Oct. 31, 1933

1,933,464

UNITED STATES PATENT OFFICE 1,933,464

MEANS FOR LUBRICATING CONVEYERS

Frederick Joseph West and Ernest West, Manchester, England, assignors to West's Gas Improvement Company Limited, Manchester, England, a British company Application September 8, 1932, Serial No. 632,222, and in Great Britain October 28, 1931

5 Claims. (Cl. 184—2)

This invention relates to the lubrication of the runner wheels and chain links of conveyers, and particularly to lubricating means of the grease gun type brought into operation automatically upon nipples on the runner wheel axles as the conveyer travels during its ordinary service.

The object of our present invention is to provide improved automatic lubricating means of the said type, the improved means being simple, durable and efficient in action.

The invention comprises a rotary element (for each line of runner wheels) carrying a grease gun or guns radiating therefrom and turned by a sprocket wheel rotated by engaging the runner wheels so as to bring the grease gun or guns into operative connection with radial nipples which lubricate the runner axles and adjacent parts, the turning of the rotary element causing in conjunction with the nipples, the necessary strokes of the grease gun or guns for delivering lubricant and for receiving a fresh supply from a suitable source upon the complete lubricating outfit.

The invention further comprises the arrangement of the two rotary elements with their sprocket wheels and grease guns upon the ends of a hollow shaft supplied with lubricant from an overhead tank or container, there being supporting bearings at the opposite sides of each rotary element.

The invention further comprises the provision of means allowing for a limited amount of relative rotary movements between the rotary elements and their associated sprocket wheels against spring pressure, to permit the grease guns to remain upon the nipples and under the control of the latter as to position, until lubrication is completed.

Referring to the accompanying sheets of explanatory drawings:—

Figure 1 is a side elevation showing one convenient application of our invention.

Figure 2 is a sectional view drawn to an enlarged scale, of the grease gun.

Figure 3 is a detail sectional end view of the means for locking the grease gun out of action when not required.

Figure 4 is a plan view and Figure 5 a sectional view of one of the runner wheels of the conveyer.

The same reference letters in the different views indicate the same parts.

Figure 6:
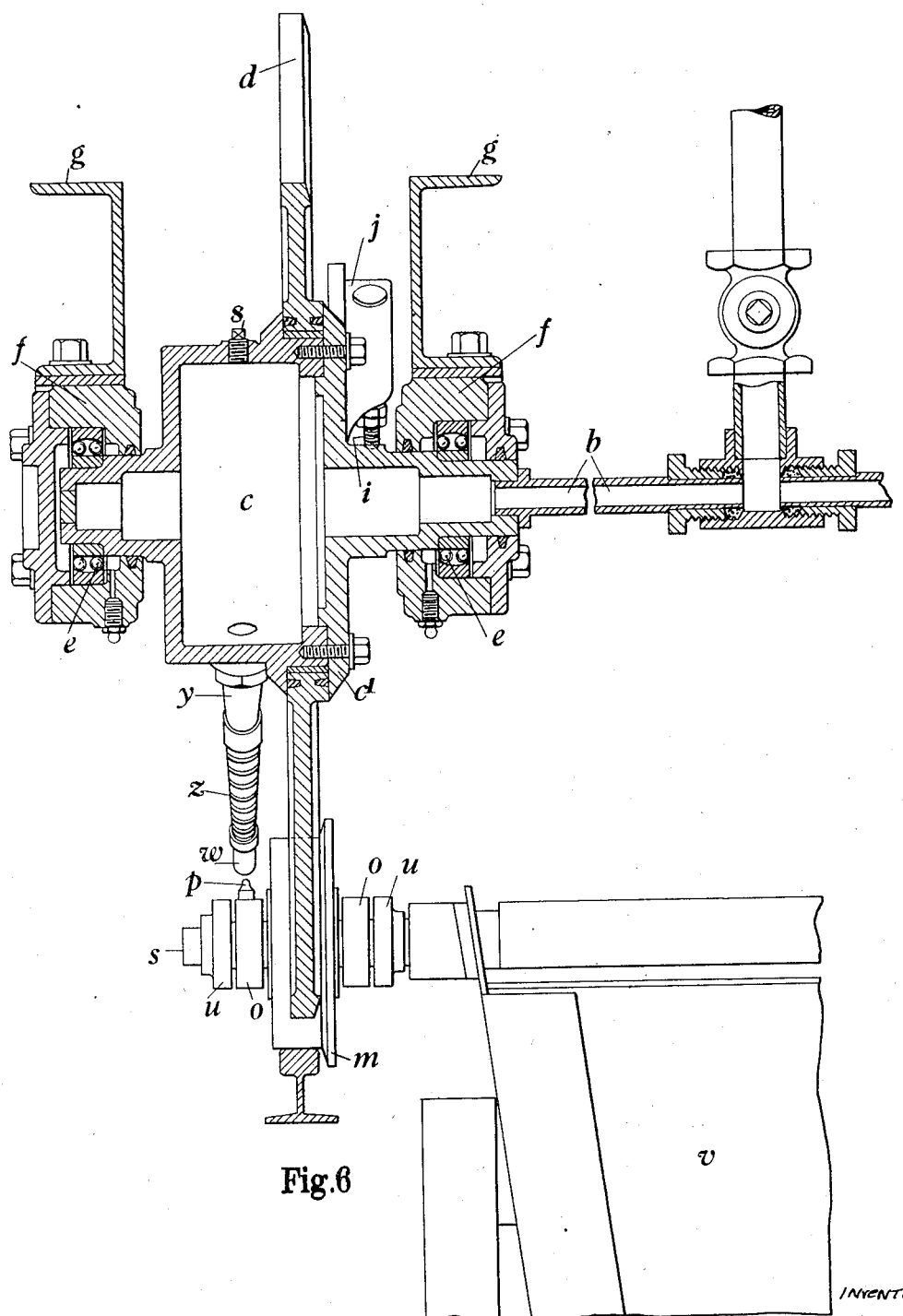
Figure 6 is a sectional end view of the parts shown in Figure 1, drawn to an enlarged scale.
Figure 7:
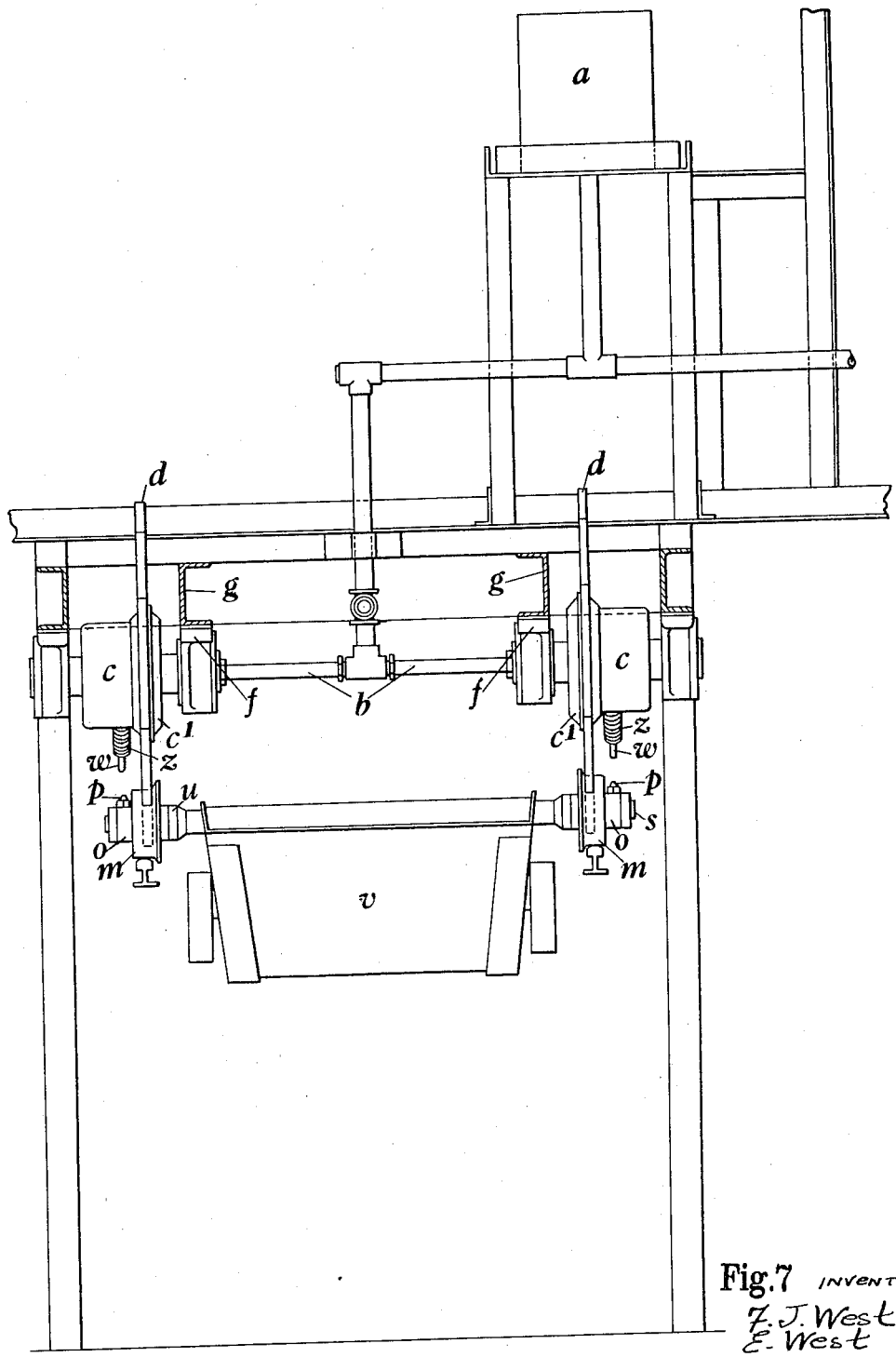
Figure 7 is an end elevation of the lubricating installation drawn to a smaller scale than Figure 1.

Lubricant is supplied from an overhead tank $a$ to a hollow shaft $b$ which at its opposite ends is connected to two hollow rotary members or drums $c$ from which any desired number of grease guns can radiate. A sprocket wheel $d$ is carried by each drum as shown in Figure 6, the said wheel being held in place upon the drum by a detachable end cover $c^1$ of the drum. There are ball or roller bearings $e$ upon trunnion-like extensions of each drum, such bearings supporting the complete outfit within brackets $f$ secured to short girders or rails $g$ above the conveyers.

The drawing connection between each sprocket wheel $d$ and the drum $c$ from which the guns radiate is by means of the adjustable bracket $k$ upon the sprocket wheel which is held in contact with the arm $j$ upon the cover piece $c$ by the spring $h$. By means of the adjustable bracket $k$, the guns $w$ may be set to register accurately with the lubricating nipples $p$ on the chain.

As a gun $w$ engages with a lubricating nipple $p$, the gun under the control of the nipple revolves relatively quicker than the sprocket wheel up to the dead centre of the gun's stroke, thus moving the arm $j$ away from the bracket $k$ and compressing the spring $h$ which is set to the correct loading by the bolt $i$. As the gun passes the dead centre position, the gap between $j$ and $k$ closes, the spring $h$ ensuring that $j$ and $k$ are held together when for the next engagement of the gun $w$ by a nipple $p$.

Each runner wheel $m$ (see Figures 4 and 5) is mounted freely upon a bush $n$ upon the projecting ends of which at each side of the runner wheel, are chain links $o$. Preferably such projecting ends are square and the links have square holes therein. The chain link $o$ at the other sides of the runner wheel has the grease nipple $p$ secured therein.

The lubricant is delivered through the nipple $p$, and holes $q$, $r$ in the link $o$ and bush $n$ to an axial groove in the runner wheel axle $s$ and so through a further hole $t$ in the bush to the runner wheel bearing surface. The axle $s$ has the other chain links $u$ pinned thereto. The buckets $v$ are carried by the axles in the usual way.

In the drawings one grease gun $w$ is mounted upon each drum $c$. It has the usual spring loaded delivery valve $x$ therein, and telescopes within the outer fixed casing $y$, being forced into its outermost position by the spring $z$. A spring loaded plunger type catch 2 can be used (by passing it beneath a shoulder 3 on the internal telescoping part of the grease gun $w$) to prevent the latter being forced into its outermost position by the spring $z$ where it can engage the nipples $p$. A cross pin 4 on the catch 2 serves in conjunction with grooves 5 and 6 in the fitting 7 to hold the catch in its operative and out-of-service positions respectively.

Each drum $c$ is fitted with a venting plug 8 which is removed whilst the drum is being filled initially so as to prevent any air remaining in the drum.

With our improvement, as the conveyer chain moves, the runner wheels engage and turn the two sprocket wheels $d$ of the lubricating machine. These turn the drums $c$ and cause the guns $w$ to engage the radial nipples $p$ on the chain links $o$ which are keyed to the bushes $n$ within the runner wheels. When once the guns have engaged the nipples, contact is maintained until the greasing operation is completed, the drums with the guns thereon being allowed to adjust themselves relatively to the sprocket wheels as before described to ensure this continuous contact. It will be understood that the normal extension of the grease guns due to the springs $z$ is such that when they engage the nipples $p$, the movement of the chain results in the nipples forcing the grease guns inwards when the piston end 9 of each gun forces the grease through the valve $x$ and out of the nipple $w$. Grease enters the cylinder 10 above the piston 9 by way of the ports 12 when the grease gun is in its extended position.

The drums may each have several grease guns thereon and be arranged to lubricate for example each alternate axle so that an odd number of axles is necessary to ensure lubrication of all axles during two circuits of the conveyer.

The lubricant supplied to the runner wheels will be forced between the bushes $n$ and wheels $m$ and the bushes $o$ and $u$ so prolonging their life.

We may vary the details of construction of our lubricating machine to suit any particular requirements.

What we claim is:

1. Means for lubricating conveyers comprising in combination a rotary element for each line of conveyer runner wheels which are provided with lubricating nipples, a grease gun carried radially by said rotary element, and a sprocket wheel rotated by and in constant mesh with said runner wheels to turn said rotary element and bring said grease gun into operative connection with said lubricating nipples, the turning of said rotary element causing in conjunction with the nipples the necessary strokes of the grease gun for delivering lubricant to the nipples.

2. Means for lubricating conveyers comprising in combination a rotary element for each line of conveyer runner wheels which are provided with lubricating nipples, a grease gun carried radially by said rotary element, a sprocket wheel rotated by and in constant mesh with said runner wheels to turn said rotary element and bring said grease gun into operative connection with said lubricating nipples, and means allowing a limited amount of relative rotary movement between said rotary element and said sprocket wheel to permit said grease gun to remain upon the nipple and under control of the latter as to position until lubrication is completed, the turning of said rotary element causing in conjunction with the nipples the necessary strokes of the grease gun for delivering lubricant to the nipples.

3. Means for lubricating conveyers comprising in combination a rotary hollow drum for each line of conveyer runner wheels, which are provided with lubricating nipples, means supplying lubricant to said drum, a sprocket wheel mounted upon said rotary hollow drum and adapted to gear with said runner wheels, a driving connection between said sprocket wheel and said rotary hollow drum permitting of an amount of relative circular movement there between, and a grease gun radiating from said rotary hollow drum and adapted to engage said nipples and to be forced inwards during the turning of the drum and the traverse of the conveyer.

4. Means for lubricating conveyers comprising in combination a rotary drum for each line of conveyer runner wheels which are provided with lubricating nipples, a source of lubricant supply, a hollow shaft connected to said source of lubricant supply and upon which said rotary drum is mounted, a grease gun carried radially by said rotary drum, and a sprocket wheel rotated by and in constant mesh with said runner wheels to turn said rotary drum and bring said grease gun into operative connection with said lubricating nipples, the turning of said rotary drum causing in conjunction with the nipples the necessary strokes of the grease gun for delivering lubricant to the nipples.

5. Means for lubricating conveyers comprising in combination a pair of rotary drums one for each line of conveyer runner wheels which are provided with lubricating nipples, an overhead lubricant container, a hollow shaft connected to said lubricant container and upon the ends of which said rotary drums are mounted, supporting bearings at the opposite sides of each of said rotary drums, a grease gun carried radially by said rotary drums, and a sprocket wheel rotated by and in constant mesh with said runner wheels to turn said rotary drums and bring said grease gun into operative connection with said lubricating nipples, the turning of said rotary drums causing in conjunction with the nipples the necessary strokes of the grease gun for delivering lubricant to the nipples.

FREDERICK JOSEPH WEST.
ERNEST WEST.